UNITED STATES PATENT OFFICE.

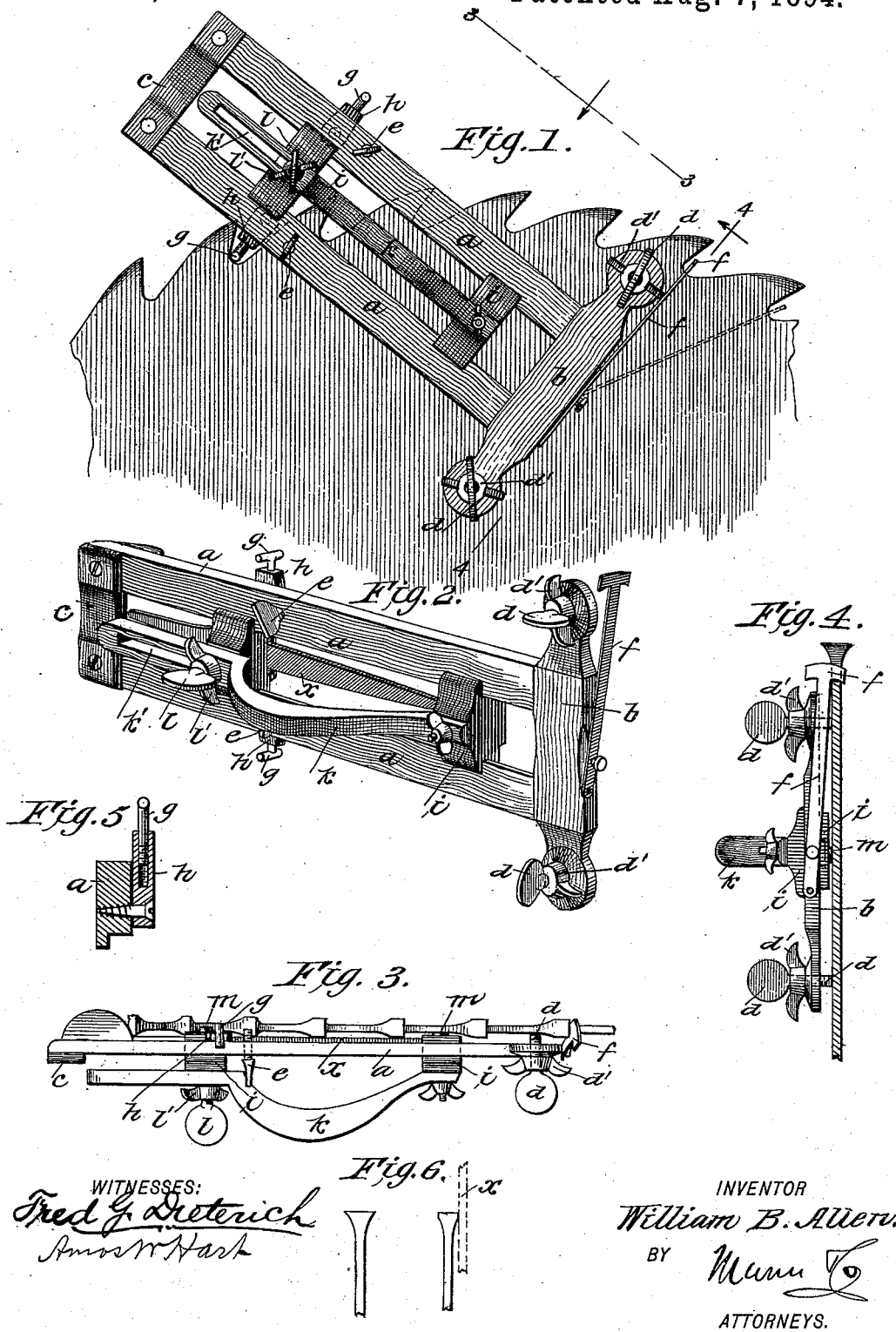

WILLIAM B. ALLEN, OF ALLENTOWN, LOUISIANA.

SAW-FILING MACHINE.

SPECIFICATION forming part of Letters Patent No. 524,234, dated August 7, 1894.

Application filed April 4, 1894. Serial No. 506,308. (No model.)

*To all whom it may concern:*

Be it known that I, WILLIAM B. ALLEN, of Allentown, in the parish of Bossier and State of Louisiana, have invented a new and Improved Saw-Filing Machine, of which the following is a specification.

This invention is a machine for filing the sides of saw-teeth. As manufactured and sold, the teeth of saws are generally more or less imperfect, being often irregular in width or lateral projection, and, if not, they inevitably become so by use and wear. As a consequence, the saws cut imperfectly, and the boards or other lumber produced are rough or "hairy" to an undue degree. When the corners or lateral edges of the saw teeth are filed or dressed to perfect uniformity, this result is avoided, and the saw runs truer, cuts better, and requires less power to drive it. The dressing is usually performed by hand, and is of course not perfect. I have devised a simple, cheap, easily-applied and easily-operated machine for the purpose, which performs the work with perfect uniformity and great rapidity. It is adapted to be instantly applied to saws of various patterns, such as circular, gang, band, &c., and may be easily adjusted as required.

In accompanying drawings, Figure 1 is a side view of my machine applied to a saw as required in use. Fig. 2 is a perspective view of my machine. Fig. 3 is a side or edge view. Fig. 4 is a cross section on line 4—4 of Fig. 1. Fig. 5 is an enlarged detail section of one of the lateral supports for the frame of the machine. Fig. 6 is a view illustrating the form of saw teeth before and after filing.

The frame of my machine is preferably constructed of iron, for the sake of rigidity, and consists of two short and narrow parallel bars, $a\ a$, which are rigidly connected at one end by a head, $b$, having extended ends, and at the other end by a plain cross-bar, $c$. A set screw, $d$, having a jam or set-nut $d'$, is inserted through each end of the head, $b$, and other set-screws, $e$, are inserted transversely through the bars, $a$, for use in adjusting and holding the frame in proper relation to the surface of the saw being dressed. A T-shaped hook, $f$, is pivoted to the center of the outer edge of the head, $b$, for use in suspending that end of the frame from the edge of a saw; and adjustable screws, $g$, having T-heads, are inserted in arms, or lugs, $h$, that are pivoted to and project laterally from the bars $a, a$, at a point slightly more than one half the distance from the head, $b$, to the cross-bar, $c$. These T-screws, $g$, serve as adjustable supports for the upper end of the frame, when applied to a saw, as shown in Fig. 1. The file, $x$, used for dressing the saw-teeth, is held detachably in two sliding cross-heads, $i$, that are adjustably connected by a rigid handle, $k$. The said cross-heads, $i$, are arranged parallel, and have grooved ends to adapt them to fit somewhat loosely and slide easily on the reduced or rabbeted inner edges of the guide bars, $a, a$. One end of the handle, $k$, is elongated, and provided with a lengthwise slot, $k'$, through which passes a clamp-screw, $l$, that secures that end of the handle to the upper cross-head. Said screw works in a threaded hole in the latter, and is provided with a jam- or set-nut, $l'$, for holding it fixed in any adjustment. The slot, $k'$, enables the cross-heads to be set different distances apart to accommodate files of different lengths. The file, $x$, is placed in parallel slots in the cross-heads, $i$, and secured by clamp-screws, $m$, inserted from the under side.

The machine is applied and used as follows: As shown in Fig. 1, the frame is suspended flatwise against the side of a saw, in an inclined position, the lower end being supported by the pivoted hook, $f$, which engages a "throat" between two teeth, while the upper end of the same is supported by the T-screw, $g$, on the lower side of the frame, which screw rests in the "throat" back of the tooth that is to be dressed. By rotating, i. e. adjusting, this screw, it is apparent the frame, and with it the file, may be readily shifted from side to side, as required to change the point of contact with the tooth from edge to center of the file. The screws, $d$, are also adjusted to regulate the space between the frame and saw blade, and thereby give the corner of the saw tooth the proper clearance; and the screw, $e$, that rests against the tooth to be dressed, is similarly adjusted so that the said tooth may be dressed to the desired and predetermined width. The operator then seizes the handle, $k$, with one hand, and places the other hand on the rear end of the frame, to steady it, and reciprocates the file, *x*, and at the same time presses on the handle so as to hold the frame against the saw blade. With two or three strokes of the file, the tooth is dressed.

It will be seen, that, by pivoting the hook, *f*, and providing an adjustable rest, *g*, for each side of the frame, the latter may be reversed, or used on either side of a saw. In fact, all that is necessary to adapt the machine for use on either side of a saw is that the hook project up on the upper side of the frame. The elasticity of the hook enables it to be engaged with saws having teeth of different sizes, and this is also promoted by reason of the lugs or arms, *h*, being pivoted.

What I claim is—

1. The improved machine for dressing the sides of saw-teeth the same consisting of a guide frame, a device for supporting the latter at its upper end, and a hook pivoted to the other end of said frame, whereby the latter is suspended from the edge of a saw, as shown and described.

2. The improved machine for dressing the sides of saw-teeth, consisting of a guide frame, a file-holder adapted to slide thereon, an elastic hook attached to one end of said frame, and a support for the other end of the latter, which, like the hook, is adapted to engage the edge of the saw, for suspending the frame therefrom, as specified.

3. The improved machine for dressing the sides of saw-teeth, consisting of a guide frame, a file-holder adapted to slide thereon, an elastic double or T-hook pivoted to one end of the frame, an arm or lug attached to the side of the frame at a point nearer its other end, and a screw working in the said arm or lug, and adapted to engage the edge of a saw, for supporting the frame adjustably, as specified.

4. The combination with a frame having parallel side bars, and means for supporting it from the edge of a saw, of a file-holder composed of two cross-heads which are fitted and adapted to slide on said bars, a rigid handle which connects said cross-heads, and has a lengthwise slot in one of its extended ends, and a clamp-screw passing through said slot and securing adjustably the handle to the cross-head, as shown and described.

WILLIAM B. ALLEN.

Witnesses:
WILLIAM D. WADLEY,
HIRAM J. ALLEN.